United States Patent [19]

Dellenberg

[11] 4,036,308
[45] July 19, 1977

[54] APPARATUS FOR REMOVING THE DRILLINGS FROM THE DRILLING SITE OF A DRILL

[75] Inventor: Hugo Dellenberg, Moordeich, Germany

[73] Assignee: Gebruder Heller Verwaltungsgesellschaft mit beschrankter Haftung, Uphusen, Germany

[21] Appl. No.: 565,568

[22] Filed: Apr. 7, 1975

[30] Foreign Application Priority Data

Apr. 9, 1974 Germany ............................ 2417228

[51] Int. Cl.² .............................................. E21C 7/02
[52] U.S. Cl. ...................................... 173/75; 175/71; 175/213; 279/20
[58] Field of Search ................... 173/60, 75; 175/71, 175/212, 213; 417/88, 160; 279/20; 15/409, 408

[56] References Cited

U.S. PATENT DOCUMENTS

| | | | |
|---|---|---|---|
| 1,132,276 | 3/1915 | Kessel | 173/60 |
| 1,154,977 | 9/1915 | Dawley | 173/60 |
| 1,263,835 | 4/1918 | App | 175/212 |
| 1,317,693 | 10/1919 | Flannery et al. | 15/409 X |
| 2,019,332 | 10/1935 | Atkins | 175/213 |
| 2,201,270 | 5/1940 | McIntyre | 175/213 |
| 2,329,330 | 9/1943 | Brailey | 175/213 |
| 3,057,417 | 10/1962 | Sandvig | 173/60 |
| 3,198,265 | 8/1965 | Voelkerding | 175/213 |
| 3,256,944 | 6/1966 | Holzapfel | 173/75 |

FOREIGN PATENT DOCUMENTS

| | | | |
|---|---|---|---|
| 644,995 | 5/1937 | Germany | 173/60 |
| 319,179 | 9/1929 | United Kingdom | 175/213 |

Primary Examiner—Ernest R. Purser
Attorney, Agent, or Firm—Hopgood, Calimafde, Kalil, Blaustein & Lieberman

[57] ABSTRACT

In the process and apparatus for removing the drillings from the drilling site of a drill described, removal is effected through a conduit, extending along the axis of a drill and possibly an adapter for a drilling machine, by a vacuum provided by a compressed-air stream traversing the removal conduit, said compressed air also serving to blow the drillings sucked into the conduit out of the conduit and away from the drilling site.

13 Claims, 3 Drawing Figures

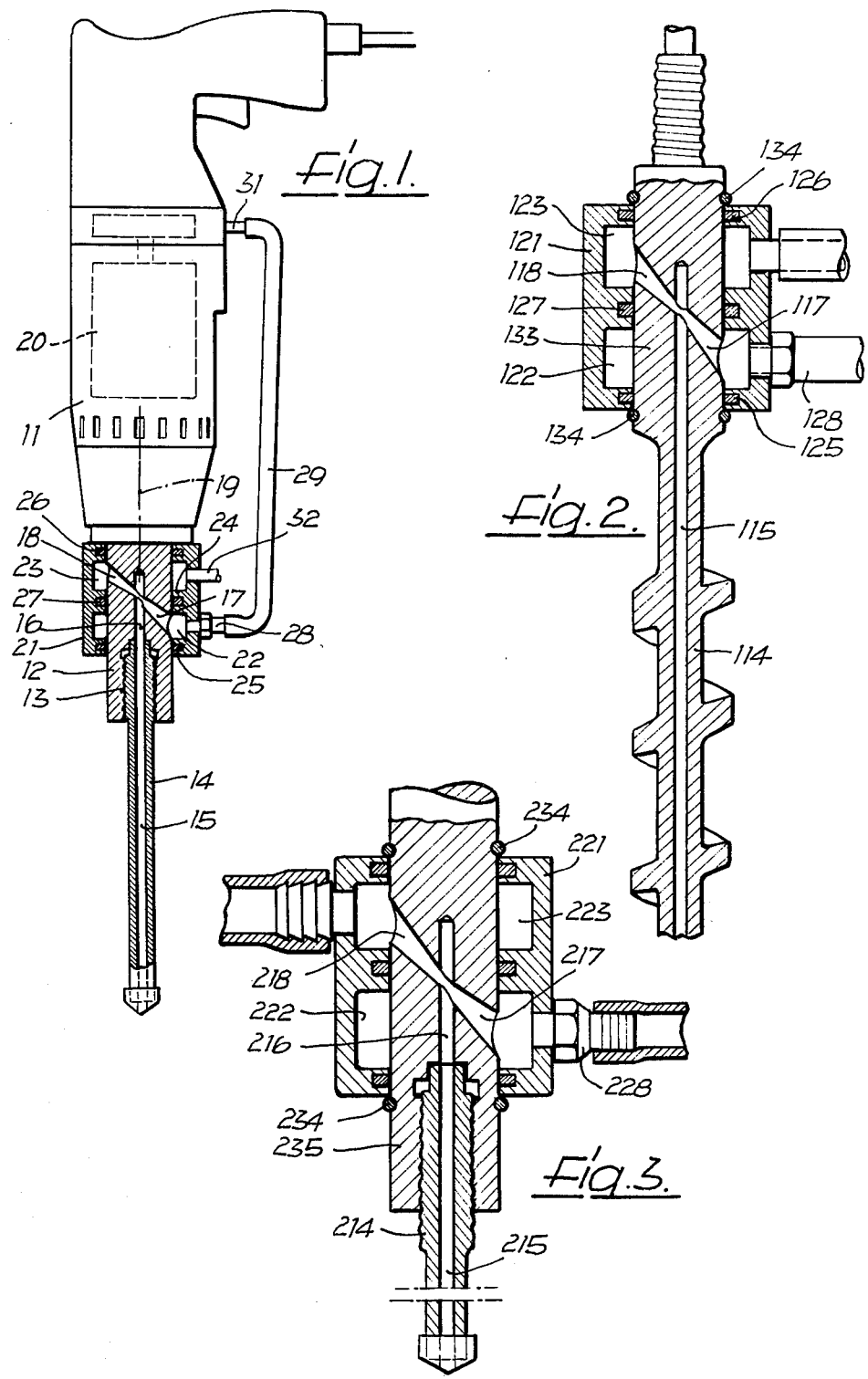

APPARATUS FOR REMOVING THE DRILLINGS FROM THE DRILLING SITE OF A DRILL

FIELD OF THE INVENTION

The invention relates to a process for removing the drillings from the drilling site of a drill, to an apparatus for operating this process, and to a drilling machine, a drill and an adapter, modified for use in said apparatus for operating said process.

It is the purpose of the present invention to provide a process for removing the drillings from the drilling site of a drill whereby clogging of the removal duct by the drillings that are to be removed, is obviated.

SUMMARY

The preferred embodiment of the present invention solves the problem of possible clogging of the removal ducts or conduits for customary drilling machines by providing a process for removing the drillings from the drilling site of the drill through a conduit extending along the axis of said drill, comprising the steps of (a) producing a vacuum in said conduit by a compressed air stream traversing said conduit (b) sucking the drillings into said conduit by said vacuum, and (c) blowing the sucked in drillings out of said conduit by said traversing compressed air stream.

Since the compressed air stream crosses the suction conduit extending in longitudinal direction of the drill axis with great speed, a vacuum is produced in the suction conduit which sucks the drillings from the drilling site through the straight suction conduit into the compressed air stream. The drillings thus sucked in are carried along by the compressed air stream. Since removal occurs only through the straight axial suction conduit which has no corners, already a comparatively small vacuum suffices to ensure that the drillings are sucked into the compressed air stream without having to anticipate possible obstructions. However, as soon as the drillings are absorbed by the compressed air stream, they are blown "around the corner", whereby it is possible to use compressed air of the high pressure necessary for a flawless conveyance "around the corner" to blow the drillings out of the suction conduit with certainty.

The process of the present invention is particularly advantageous for its purpose, because the cooling air of an electromotor driving the drill can be used as the compressed air stream, a fan wheel of the motor possibly providing the compressed air source.

This process can be operated with an apparatus in connection with a drilling machine having a housing and a motor for driving a drill inserted into the cavity of a chuck, such apparatus comprising:

a. a cylindrical wall surrounding a closed end part of a suction conduit extending from its open end at the drilling site in the direction of the axis of said drill, said conduit for sucking in the drillings from the drilling site to said closed end part, b. first and second cross or transverse holes in said wall, said holes traversing said end part of said suction conduit and merging to continue each as the other on different sides of said suction conduit to convey said compressed air stream tranversely to said suction conduit, c. a connecting ring surrounding said cylindrical wall and forming an inner supply air annulus closed by said cylindrical wall, d. a connecting piece on said connecting ring for connecting said annulus to a source of said compressed air stream, and e. said connecting ring adapted for non-rotating connection to said housing in such a position, that said first cross hole connects said inner supply air annulus with said suction conduit and said second cross hole connects said suction conduit with a location outside of said supply air annulus to remove the drillings from said end part of said suction conduit by said compressed air stream.

The invention is also directed to an apparatus for operating the process of the present invention, such apparatus provided with a connecting ring non-rotatably attachable to the housing of the apparatus and, together with a cylindrical outer wall rotatable during drilling of a suction conduit extending in the direction of the spindle axis, enclosing an inner supply air annulus open toward the inside of said ring, such annulus connectable to a compressed-air feed line by means of a connecting piece. This connecting piece can be non-rotatably attached to the housing of the apparatus, merely by a line provided for feeding the compressed air, which line, for example, connects the connecting piece for removing the cooling air of the electromotor driving the drilling machine with the connecting piece of the connecting ring. This connecting ring can be placed onto a drill or onto an adapter which is introduced into the chuck of a drilling machine, if such drill or adapter is provided with a removal conduit and has at least one pair of cross or transverse holes of which the first cross hole connects the supply air annulus of the connecting ring with the suction conduit and the second cross hole of the same pair connects the suction conduit with a location outside of the supply air annulus for the purpose of removing the drillings.

One of the advantageous embodiments of the apparatus pursuant to the present invention provides for positioning the suction conduit in the spindle of the drilling machine such that the connecting ring surrounds the cylindrical outer surface of the spindle, that the spindle has, for the purpose of conveying the compressed-air stream traversing the suction conduit, at least one pair of cross or transverse holes which merge to essentially continue each as the other on different sides of the suction conduit, whereby the first cross hole of one pair connects the supply air annulus of the connecting ring with the suction conduit and the second cross hole of the same pair connects the suction conduit for the purpose of removing the drillings with a location outside the supply air annulus, preferably with the exhaust air annulus. Thereby it is possible to use commercially available drills with the process of the present invention, provided such drills have an axially extending passage for forming a suction conduit.

A further advantageous embodiment of the present invention provides that both cross or transverse holes of one pair of holes on the one hand and the suction conduit on the other hand define two longitudinal axes forming an acute angle, so that the first cross hole is closer to the drilling site than the second cross hole. This has the effect that the drillings are diverted from the axial suction conduit into the second cross hole around a bend greater than 90°, whereby one component of the speed vector of the compressed air drops in the direction of suction of the suction conduit, which promotes drawing off the drillings through the suction conduit and blowing the drillings away, out of the suction conduit.

In order to achieve as strong a suction effect in the suction conduit as possible at a specific pressure of the compressed air, the two cross or transverse holes of one pair may together form a Venturi-tube with a constricted middle section which is crossed by the suction conduit.

The process of the present invention can be used with drilling machines of different types; this always guarantees that removal occurs only through the suction conduit extending in longitudinal direction of the drill axis, and the drillings are then blown out at the end of this suction conduit by the compressed air stream crossing the same.

The invention also pertains to a drill for operating the process of the present invention, said drill having a suction conduit extending along its axis. This particular drill has at least one pair of cross or transverse holes which merge to continue each as the other at different sides of the suction conduit, whereby the first cross hole of the one pair is intended for connecting the supply air annulus of the connecting ring with the suction conduit, and the second cross hole of the same pair for connecting the suction conduit with a location outside of the supply air annulus, optionally with the exhaust air annulus. The connecting ring for feeding the compressed air may thereby be connected to the drilling machine. In order to be able to use drills of different diameters with one and the same drilling machine, one advantageous embodiment of the drill according to the present invention has a collar at the drill spindle for accepting transverse holes, the outer diameter of said collar being always of the same size and the inner diameter adapted to the connecting ring of the drilling machine.

In a further embodiment of the drill, the connecting ring is rotatably supported on the drill spindle, optionally on the collar of the spindle, but it cannot be axially displaced. This embodiment of the drill has the advantage that the drill can be used with any kind of drilling machine, whereby it is merely necessary to provide for the compressed air feed to the connecting ring, which can be accomplished simply by connecting the connecting piece of the supply air annulus of the connecting ring with the exhaust connection for the cooling air of the driving motor of the drilling machine.

The invention is also directed to an adapter for insertion into the tool chuck of the drilling machine, for accepting a drill having an axial suction conduit to operate the process of the invention. The adapter of this embodiment is provided with an axial suction conduit which continues the axial conduit of the drill, with at least one pair of traverse or cross holes merging to continue each as the other on different sides of a suction conduit, whereby the first cross hole of one pair is provided for connecting the fresh air annulus of the connecting ring with the suction conduit, and the second cross hole of the same pair for connecting the suction conduit with a location outside of the supply air annulus, optionally with the exhaust air annulus. This permits operating the process of the present invention with a commercially available drill, if the same is provided with an axially extended through suction conduit. Particular advantages result if the connecting ring is rotatably, but not axially displaceably supported on a cylindrical part of the adapter body. In such case, a commercially available drilling machine can be used. It is then merely necessary to provide for a supply of compressed air to the connecting piece of the supply air annulus, e.g., by attaching this connecting piece to the exhaust connection piece of the cooling system of the driving motor.

Still further embodiments and advantages of the present invention will readily occur to one skilled in the art to which the invention pertains, upon reference to the following detailed description.

DESCRIPTION OF THE DRAWINGS

The description refers to the accompanying drawings in which like reference characters refer to like parts throughout the several views and in which:

FIG. 1 is a partial cross section of a side view of an embodiment of a drilling machine;

FIG. 2 is a cross section of an embodiment of a drill;

FIG. 3 is a cross section of an embodiment of an adapter.

DESCRIPTION OF THE PREFERRED EMBODIMENTS

Referring now to the drawings, the invention is described with reference to a drill press as illustrated in FIG. 1 having a housing 11 and a spindle 12. At its free end, the spindle 12 is provided with a threaded female chuck 13 for accepting tools, such as a drill 14 with an axial suction conduit 15 extending the entire length of the drill. The chuck 13 of the spindle 12 continues in a suction conduit 16 which is in alignment with the suction conduit 15 of the drill 14 inserted into the spindle. Furthermore, the spindle 12 is provided with a pair of cross or traverse holes 17 and 18, each of which continues as the other on different sides of the suction conduit 16, each of said cross holes tapering off toward the suction conduit 16 and together forming a cross conduit 17, 18 traversing the suction conduit 16, similar to a Venturi-tube having its smallest diameter at the spot where it traverses the suction conduit 16. The axis of the cross conduit 17, 18 forms an acute angle with the spindle axis 19 so that the second cross hole 18 is closer to the drill press housing 11 than the first cross hole 17.

A connecting ring 21 is attached to the housing 11 of the drill press, and surrounds the cylindrical outer surface of the spindle 12. Together with the cylindrical outer surface of the spindle 12, said connecting ring encloses a supply air annulus 22 and an exhaust air annulus 23, separated from each other by an annular rib 24. Seals 25 and 26 serve to seal any slot or gap between the ring 21 and the spindle 12 connecting the supply air annulus 22 and the exhaust air annulus 23 with the atmosphere, respectively. In addition, rib 24 is equipped with a further seal 27 to provide an tight seal between the two annuli 22 and 23. The connecting ring 21 is provided with a connecting piece 28 by means of which a compressed-air line 29 can be connected to the supply air annulus 22. The other end of the compressed-air line 29 is attached to a connecting piece 31 serving to remove the cooling air of the electromotor 20 driving the drill press, which then is fed into the supply air chamber 22 through the line 29 as compressed air.

Operation of the embodiment of the drill press as represented in FIG. 1 consists in feeding the cooling air leaving the connecting piece 31 during rotation of the electromotor of the drill press, through the line 29 into the supply air annulus 22 as compressed air, from where it is conducted through cross conduit 17, 18 into the exhaust air annulus 23 and conveyed from there by means of a line 32 into a collecting bin for the drillings.

As a result of the compressed air stream passing through the cross conduit, a vacuum is produced in the suction conduit 16, causing air to be drawn in through both suction conduits 15 and 16, from the free end of drill 14. By means of this air stream, the drillings formed at the free end of the drill during drilling operations, are drawn into the suction conduits 15 and 16, until they reach the cross conduit 17, 18 and are caught up in the compressed air stream and are blown out through the line 32 by way of the exhaust air annulus 23. Although the suction produced in the suction conduits 15 and 16 as a result of the compressed air stream is less than 1 Atm in any case, the drillings are readily drawn away from the drilling site, because the suction conduits merge rectilinearly, thus obviating suction of the drillings "around the corner". The drillings are picked up by the compressed air upon entry into the cross conduit 17, 18 and only then are propelled away "around the corner" through the cross hole 18. This avoids clogging of the suction and removal lines.

Those parts of the embodiment illustrated in FIG. 2 corresponding to similar parts contained in the embodiment of FIG. 1 were assigned the same reference characters to which the number 100 has been added, so that a reference to the previous section of the specification is thereby provided.

The embodiment of a drill pursuant to the invention as illustrated in FIG. 2, differs from the previous example in that the connecting ring 121 is arranged rotatable but not axially displaceable on the collar 133 of the drill 114. In order to secure the connecting ring 121 against axial displacement, spring washers 134 are provided for both ends of said connecting ring, inset in annular grooves of the collar 133. The suction conduit 115 of this drill does not extend all the way through, but ends inside of the collar 133 where, similar to the previous example, it is traversed at an angle by the cross conduit 117, 118 formed by the two cross holes 117 and 118. In this case, connecting ring 121 again forms a lower supply air annulus 122 and a top exhaust air annulus 123, into which the cross holes 117 and 118 discharge, respectively.

The drill represented in FIG. 2 can be employed with any commercially available drill press having a suitable tool carrier or chuck. In this case, the connecting piece 128 must merely be connected to a compressed air source, e.g., by means of the connecting piece 31 of the driving motor 20 of the drill press, through which the cooling air of the motor is discharged. Also in the case of this example, the supply air annulus 122 and exhaust air annulus 123 are sealed by means of seals 125, 126, and 127.

The inventive features of the drill of FIG. 2 have the same effect as the inventive features of the drill press shown in FIG. 1.

Those parts of FIG. 3 which correspond to similar parts already shown in the examples of the invention illustrated in FIGS. 1 and 2, were assigned like reference characters to which either 200 or 100 were added, respectively, so that a reference to the previous section of the specification is thereby provided.

The adapter 235 represented in FIG. 3 serves to accept drills 214 having one axial suction conduit 215 extending all the way through, as illustrated in the example shown in FIG. 1. Correspondingly, the adapter 235 is provided with a tool chuck for a drill 214 corresponding to that of the spindle 12 of the first embodiment. The other end of the adapter 235, not represented in this drawing is constructed in a manner familiar from the prior art to fit tool chucks in drill presses, so that the adapter can be inserted into the tool chuck of a drill press in a manner similar to that of a drill.

Similar to spindle 12, adapter 235 is provided with a suction conduit 216, and also with cross or transverse holes 217 and 218 inclined in a similar fashion and shaped like the cross holes of the previous illustrating examples. A connecting ring 221 sits on the adapter 235 in a manner similar to that of the connecting ring 121 on the collar 133 of the drill 114. Said ring encloses a supply air annulus 222 and an exhaust air annulus 223 that are sealed off from each other and with respect to the atmosphere, just as in the case of the connecting rings of the previous illustrating examples. Thereby, the connecting ring 221 is movably positioned on the adapter 235 and secured against axial displacement by the spring washers 234.

The performance of the inventive embodiment of this adapter is the same as in the case of the examples just described. This particular embodiment has the additional advantage that commercially available drill presses as well as commercially available drills 214 with axial suction conduits 215 extending the length of the drill, can be employed with the adapter 235. This, just as in the case of the example illustrated in FIG. 2, one must only take care that compressed air is fed to the connecting piece 228.

In a further illustrating example, the connecting ring 121 of the drill according to FIG. 2 can be left off. Such drill may be employed with a drill press of the present invention as illustrated for example in FIG. 1, if the spindle with the chuck 13 extends into the housing 11 such that the interior of the connecting ring 21 is free for receiving the collar 133 of the drill, and if connecting ring 21 has been constructed to fit on collar 133 of the drill.

The connecting ring 21 of the drill press shown in FIG. 1 furthermore can only be connected to the housing 11 by means of the compressed-air line 29. In such a case, the drill press can take the drill shown in FIG. 2, for example, without the connecting ring 121. In this case, the connecting ring 121 merely must be positioned on the drill at the time the drill is inserted, and must then be secured against axial displacement, e.g., by the spring washers 134. In this arrangment, drills of different sizes may be used for the same drill press, provided they have the same collar 133.

Furthermore, an adapter 235 pursuant to the present invention may also be constructed corresponding to FIG. 3, but without the connecting ring 221. What has just been said concerning the corresponding construction of the drill of FIG. 2, would then apply here as well.

The exhaust air annulus 23, 123, 223 is not absolutely necessary. It merely serves to prevent that the drillings that are discharged are blown out into space. For the purpose of collecting the drillings, the spindle 12 or the end of the drill press closest to the tool chuck may be surrounded by a collecting bin of arbitrary construction, which merely prevents the drilling from being blown out into space.

Although my invention has been illustrated and described with reference to the preferred embodiments thereof, I wish to have it understood that it is in no way limited to the details of such embodiments, but is capable of numerous modifications within the scope of the appended claims.

What is claimed is:

1. An apparatus for removing the drillings from a drilling site of a drill of a drilling machine provided with a housing, a chuck and a motor for driving said drill which is inserted into the cavity of the chuck, said apparatus comprising:
   a. a suction conduit having an open end at said drilling site and a closed end spaced therefrom, said conduit extending in the direction of the rotational axis of said drill for sucking in drillings from the drilling site toward said closed end;
   b. a wall having a cylindrical outer surface, said wall surrounding said closed end of said suction conduit and a portion of said suction conduit adjacent to said closed end, said cylindrical outer surface having first and second axially spaced holes formed on opposed sides thereof, and first and second cross conduits connecting said first and second holes respectively to said portion of said suction conduit, said first and second cross conduits meeting at said suction conduit to form a continuous passage through said wall for conveying a compressed air stream from said first hole to said second hole across said suction conduit;
   c. a connecting ring surrounding said cylindrical wall surface and forming an inner air supply annulus closed by said cylindrical wall surface;
   d. a compressed air source and a connecting piece on said connecting ring for connecting said air supply annulus to said compressed air source; and
   e. said connecting ring being adapted for non-rotating connection to said housing in such a position that said first axial hole opens into said inner air supply annulus, and said first cross conduit connects said inner air supply annulus with said suction conduit, and said second axial hole opens into an area outside said inner air supply annulus, and said second cross conduit connects said suction conduit with said second axial hole to remove the drillings from said portion of said suction conduit by said compressed air passing through said first and second cross conduits and across said suction conduit.

2. An apparatus as defined in claim 1, wherein said connecting ring forms an inner exhaust air annulus closed by said cylindrical wall surface, said exhaust air annulus including, a connecting piece for connecting said annulus to a line for removing said drillings, and wherein said second cross conduit connects said suction conduit to said exhaust air annulus through said second hole.

3. An apparatus as defined in claim 1, wherein both said first and second cross conduits on the one hand and said suction conduit on the other hand define two longitudinal axes forming an acute angle, said first cross conduit being closer to said drilling site than said second cross conduit.

4. An apparatus as defined in claim 1, wherein said first and second cross conduits together form a Venturi-tube having a constricted middle section, and wherein said suction conduit crosses said middle section of said Venturi-tube.

5. An apparatus as defined in claim 1, wherein said compressed air source is provided by a fan wheel attached to said driving motor.

6. An apparatus as defined in claim 1, wherein said drilling machine is provided with a spindle forming said cylindrical wall surface and said chuck for said drill, and wherein said portion of said suction conduit is connected to said cavity of said chuck.

7. An apparatus as defined in claim 1, wherein said connecting ring is affixed to said housing of said drilling machine.

8. An apparatus as defined in claim 1, wherein said drill forms said cylindrical wall and wherein said connecting ring has a form that permits fitting it onto said cylindrical wall of said drill.

9. An apparatus as defined in claim 8, wherein said connecting ring is rotatably connected to said drill but not axially displaceable.

10. An apparatus as defined in claim 8, wherein said suction conduit forms a blind hole in said drill.

11. A drill comprising:
   a forward end for engagement at a drilling site;
   a shank having a cylindrical outer surface with first and second axially spaced substantially opposed holes formed therein;
   an axial suction conduit extending from said forward end to a dead end within said shank;
   first and second cross conduits connecting said first and second holes respectively, with said axial suction conduit, said cross conduits having a maximum cross sectional area at said holes and a minimum cross sectional area at said suction conduit and being substantially aligned with each other to form a Venturi-tube extending through said shank with a constricted middle section intersecting said suction conduit; and
   a connecting ring surrounding a portion of said cylindrical outer surface to form an air supply annulus enclosed by said connecting ring, said connecting ring being rotatably connected to said outer surface of said shank in a position such that said first axially spaced hole opens into said air supply annulus, and said second axially spaced hole opens into an area outside said air supply annulus.

12. A drill comprising:
   a forward end for engagement at a drilling site;
   a shank having a cylindrical outer surface with first and second axially spaced substantially opposed holes formed therein;
   an axial suction conduit extending from said forward end to a dead end within said shank;
   first and second cross conduits which connects said first and second holes respectively with said suction conduit, said first and second cross conduits being substantially aligned to form a continuous passage which intersects said suction conduit at an acute angle at a point adjacent to said dead end of said suction conduit; and
   a connecting ring surrounding a portion of said cylindrical outer surface to form an air supply annulus, said connecting ring being rotatably connected to said outer cylindrical surface of said shank in a position such that said first axially spaced hole opens into said air supply annulus, and said second axially spaced hole opens into an area outside said air supply annulus.

13. An adaptor for use with a drilling machine including:
   a chuck having a substantially cylindrical surface with first and second axially spaced substantially opposed holes formed therein and a hollow cavity to accommodate a drill, said chuck further having an axial suction conduit which extends from a dead end within said chuck to an open end which communicates with said cavity;

first and second cross conduits which connect said first and second holes respectively with said suction conduit, said first and second cross conduits being substantially aligned to form a continuous passage which intersects said suction conduit at an acute angle at a point adjacent to said dead end of said suction conduit; and a connecting ring surrounding a portion of said cylindrical outer surface of said chuck to form an air supply annulus closed by said connecting ring, said connecting ring being rotatably connected to said outer cylindrical surface of said chuck in a position such that said first axially spaced hole opens into said air supply annulus, and said second axially spaced hole opens into an area outside said air supply annulus.

* * * * *